(No Model.)
G. B. BAER.
SEPARATING CROSS HEAD TIE WIRES.
No. 445,828. Patented Feb. 3, 1891.
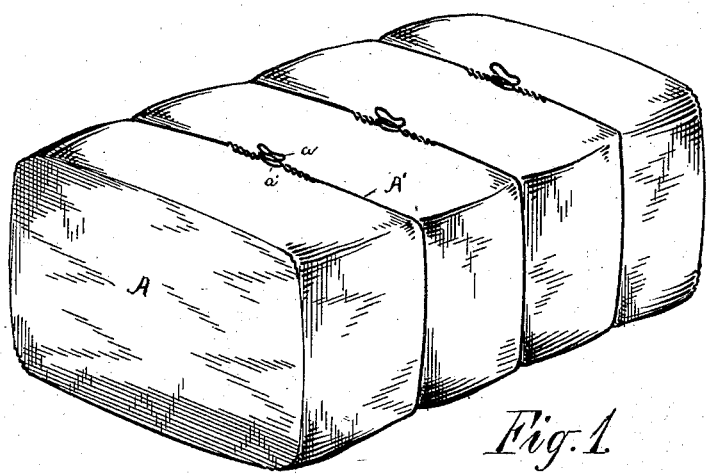
Fig. 1.
Fig. 2.
Fig. 3.
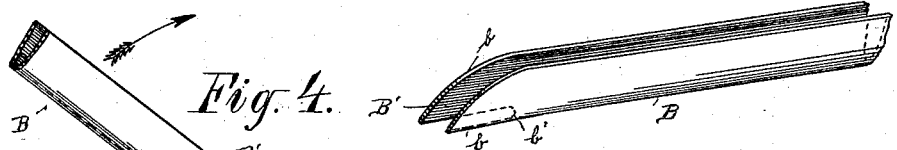
Fig. 4.
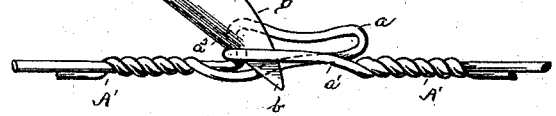
Fig. 5.
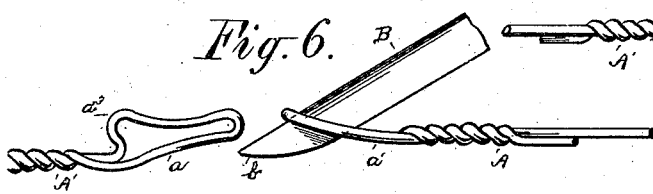
Fig. 6.
Witnesses.
J. H. Monteverde
Charles J. Armbruster
Inventor.
George B. Baer
By Boomer & Acker

UNITED STATES PATENT OFFICE.

GEORGE B. BAER, OF CLOVERDALE, CALIFORNIA.

SEPARATING CROSS-HEAD TIE-WIRES.

SPECIFICATION forming part of Letters Patent No. 445,828, dated February 3, 1891.

Application filed September 24, 1890. Serial No. 365,960. (No model.)

*To all whom it may concern:*

Be it known that I, GEORGE B. BAER, a citizen of the United States, residing at Cloverdale, in the county of Sonoma and State of California, have invented certain new and useful Improvements in Separating Cross-Head Tie-Wires; and I do hereby declare the following to be a full, clear, and exact description of said invention, such as will enable others skilled in the art to which it most nearly appertains to make, use, and practice the same.

My invention relates to certain new and useful improvements in the opening or untying of cross-head bale-wires for the binding of pressed hay, straw, or the like by other means than the cutting of the wire.

Heretofore in order to release the hay of its wire binding it has been necessary that the wire be cut, thus not only absolutely destroying the wire for future use, but creating considerable annoyance and delay in freeing the compressed hay from its binding or tie wires. By freeing or untying the wire, as hereinafter set forth, I not only expedite the removal thereof, but at the same time obviate the cutting of the same, thereby saving the destruction thereof and allowing of the same being reused for baling purposes. The objection raised by farmers and the public generally to wire-baled hay consists in the difficulty of releasing the same, consequently preferring the rope-bound bales, although the former possesses the advantage of a more secure fastening.

In order to properly comprehend my invention, reference must be had to the accompanying sheet of drawings, wherein similar letters of reference relate to corresponding parts throughout the entire specification and several views.

Figure 1 is a perspective view showing the bale secured by its wire tie-wire; Fig. 2, a detail view showing the wire united by means of the cross-head tie; Fig. 3, a detail view of the opening-tool; Fig. 4, a view similar to Fig. 2, showing the opening-tool inserted in position; Fig. 5, a similar view showing the tool thrown over and the fastening-head of the wire about to be released from the loop end; Fig. 6, a view showing the ends detached.

The letter A indicates an ordinary pressed bale of hay, and A' the binding-wires thereof. The ends of said wires are provided with the fastening-head $a$ and loop $a'$, which are adapted to interlock, thus forming the ordinary cross-head bale-tie.

The releasing or opening tool is indicated by the letter B, which consists of an ordinary piece of steel, zinc, or the like material suitably turned or flanged so as to provide the inclined guideway B'. The end of said tool or opener is bifurcated, so as to form forwardly-extending arms $b$. As a matter of convenience any suitable handle may be secured to said tool. In order to release the bale-wire, the extending arms $b$ are inserted within the loop $a'$, embracing the fastening-head $a$ and causing the hooked end $a^3$ thereof to bear or impinge against the point $b'$. (Clearly shown in Fig. 4 in dotted lines.) The ends of arms $b$ will thence be secured within the pressed hay, and upon forward pressure being exerted on said tool the same will act as a leverage, and with the movement thereof the securing-head $a$ will be forced forward and slightly downward, and at the same time loop $a'$ thrown or bent upward at such an angle that when the tool reaches its entire throw (shown in Fig. 5) the same will be entirely clear of the securing-head $a$, whence the outward pressure of the baled hay will suffice to slide within the guide end of the tool and free itself of loop $a'$, as clearly shown in Fig. 6.

It will be observed that the untying is accomplished by mechanical pressure sufficient to force the securing-head $a$ forward and retaining-loop $a'$ upward until sufficient to permit the securing-head to pass thereunder, whence by the outward pressure of the baled hay the two are caused to separate. By thus releasing the cross-head tie the wire is removed without damage, thus allowing of its being reused for baling purposes.

Having thus described my invention, what I claim as new, and desire to secure protection in by Letters Patent of the United States, is—

The described tool for untying or releasing cross-head tie-wires, approximately U-shaped in cross-section, having its forward or operating end provided with arms having forwardly and downwardly inclined upper edges, substantially as set forth.

In testimony whereof I affix my signature in presence of two witnesses.

GEORGE B. BAER.

Witnesses:
R. S. MARKELL,
H. C. CARRIE.